AUTOMATIC FREQUENCY CORRECTION IN TWO-WAY CARRIER COMMUNICATION SYSTEMS
Filed Oct. 29, 1956
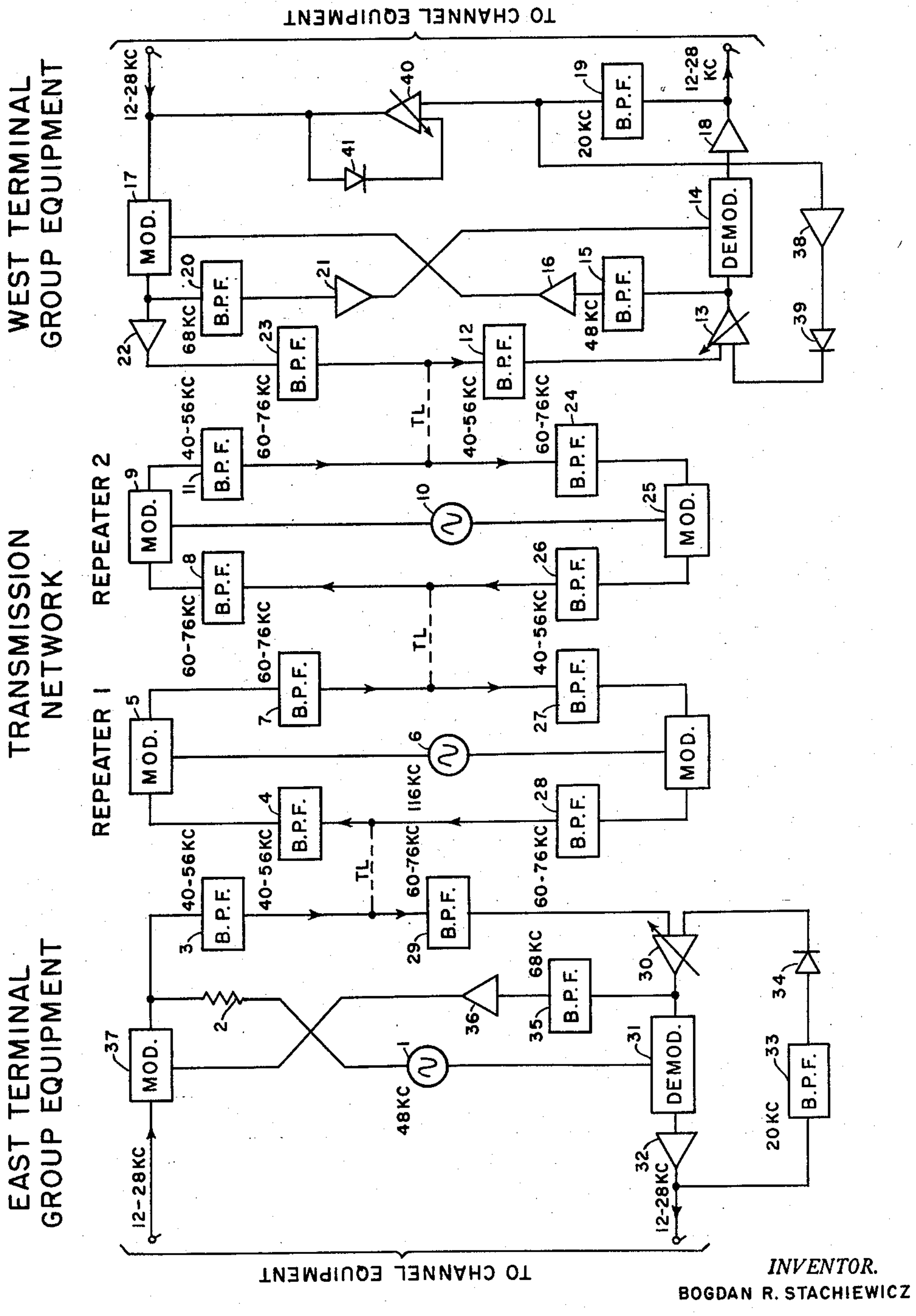
INVENTOR.
BOGDAN R. STACHIEWICZ
BY F. H. Henson
AGENT United States Patent Office 2,871,294
Patented Jan. 27, 1959

2,871,294

AUTOMATIC FREQUENCY CORRECTION IN TWO-WAY CARRIER COMMUNICATION SYSTEMS

Bogdan R. Stachiewicz, Rochester, N. Y., assignor to General Dynamics Corporation, Rochester, N. Y., a corporation of Delaware Application October 29, 1956, Serial No. 619,059

14 Claims. (Cl. 179—15.5)

This invention relates in general to two-way carrier communication systems and, more particularly, to automatic frequency correction in two-way two-wire carrier communication systems in which the carrier terminals are interconnected by a transmission network which tends to introduce the same frequency error in signals transmitted therethrough in both directions of transmission.

When frequency frogging, or band inverting, repeaters, which may introduce frequency errors in transmitted signals, are used on a transmission line to achieve slope correction by interchange of frequencies, a distorted reproduction of the signals may be produced at the receiving terminal if a local oscillator is used at the receiving terminal for demodulation. It is desirable, therefore, to obtain the demodulating frequency at the receiving terminal from a pilot signal, or signals, transmitted from the transmitting terminal. Since the pilot signal, or signals, utilized to derive the demodulating frequency are subject to the same frequency distortion as the transmitted sideband, or sidebands, the errors cancel out when the sideband is demodulated and an accurate reproduction of the transmitted signals is obtained.

Several types of automatic frequency correction systems have been proposed in the prior art. In a first type of system, a pilot frequency is transmitted along with the sideband by the transmitting terminal. The received pilot frequency is modulated with the output of a local oscillator at the receiving terminal to obtain a demodulating carrier frequency for demodulating the received sideband. In a second type of system, a pilot frequency is transmitted for each channel, or two channels in twin channel systems, along with the sideband for each channel. The pilot frequency is of the same frequency as the required demodulating frequency for these channels. Thus, the pilot frequency is picked off in the channel equipment and used directly as a channel carrier to demodulate the sideband into the voice band.

Both the first and second types of systems have the limitation that frequency error correction is made in just one direction of transmission. Therefore, duplicate equipment must be provided in the reverse direction of transmission. In addition, the channel pilot type of operation is not suitable for tandem switching where it is necessary to interconnect several transmission systems at group frequencies. As previously described, the channel pilot type of operation requires demodulating to voice frequencies to correct for frequency errors and then remodulating to group frequencies before interconnection with another system.

Accordingly, it is the general object of this invention to provide a new and improved two-way carrier system.

It is a more particular object of this invention to provide a new and improved two-way carrier system in which frequency errors introduced in transmitted signals are automatically eliminated so that an accurate reproduction of the transmitted signals may be produced at the receiving terminal.

It is a further object of this invention to provide a new and improved two-way carrier system in which two-way frequency correction is accomplished in the group equipment with a minimum of apparatus.

In accordance with the present invention, group pilot frequencies and group carrier frequencies are interchangeable. That is, the pilot frequency transmitted from the first terminal is utilized as a group carrier wave for signals transmitted from the second terminal and the pilot frequency transmitted from the second terminal is utilized as a group carrier wave for signals transmitted from the first terminal. A local oscillator at the first terminal produces a first pilot frequency which is transmitted to the second terminal. At the second terminal, a second pilot frequency is derived from the first pilot frequency and is thus shifted in frequency by an amount equal to the frequency error introduced in the first pilot frequency by the band inverting repeaters. Also at the second terminal, the received first pilot frequency is modulated with group signals to be transmitted to the first terminal. Thus, the sideband to be transmitted to the first terminal is also shifted in frequency by an amount equal to the frequency error introduced in the first pilot frequency. The sideband and second pilot frequency are transmitted to the first terminal and arrive at said first terminal without frequency error since the shift in frequency equal to the frequency error is canceled out in the transmission network. At the first terminal, the received sideband is demodulated with the first pilot frequency obtained from the local oscillator at the first terminal, and the second pilot frequency without error is modulated with group signals to be transmitted to the second terminal. At the second terminal, the received sideband with frequency error is demodulated with the second pilot frequency, which includes the frequency error, so that the original signal is reproduced without error.

The method of deriving the second pilot frequency from the received first pilot frequency at the second terminal is shown and described in my copending application, Serial No. 619,060, filed on Oct. 29,1956, and assigned to the same assignee as the present invention. Briefly, this is accomplished by providing a band-pass filter, which is sharply tuned to the difference frequency of the first and second pilot frequencies, and which is connected between the output of the demodulator in the receiving circuit and the input of the modulator in the transmitting circuit at the second terminal. The received first pilot frequency is modulated in the transmitting modulator with the signal passed by the filter to produce the second pilot frequency.

A particular advantage of the invention is that the single oscillator, which is located at the first terminal, may drift in frequency without introducing errors in the transmitted signals since the output of the single oscillator is utilized to modulate and demodulate the signals transmitted in both directions. Therefore, this particular feature of the invention finds additional use in two-wire or four-wire transmission short haul carrier systems or in two-way radio link systems where no repeaters or other frequency distorting elements are used between the terminals.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which shows a block diagram of first and second carrier terminals interconnected by a two-wire transmission network which includes an even number of band inverting repeaters.

Referring to the drawing, it can be seen that the east carrier terminal group equipment is interconnected with the west carrier terminal group equipment by a transmission network comprising band inverting repeaters 1 and 2. Only the portion of the repeaters necessary for a complete understanding of the invention has been shown since the repeaters, as such, form no part of the invention.

It will be noted that specific frequency values and frequency ranges have been assigned to the various components of the system. It is to be understood that the operation of the system is in no way limited to the range of frequencies shown and that particular frequencies are shown only for the purpose of illustrating the operation of the system. As previously stated, the only limitation is that the pilot frequencies and group carrier frequencies must be interchangeable. With the frequencies shown, the system is arranged for four-channel, twin-channel operation with 16 kc. and 24 kc. oscillators being used as the channel carrier oscillators in each terminal to produce a 12–28 kc. four-channel band of signals. In this connection, it is also to be noted that the invention is not limited to four-channel operation. By the proper selection of group carrier frequencies and pilot frequencies, a number of channels equal to the maximum number of channels found in any conventional carrier system may be served by the group equipment illustrated.

As illustrated, oscillator 1 generates a 48 kc. first pilot frequency which is applied through resistor 2 and band-pass filter 3 to the transmission line TL. At repeater 1, the first pilot frequency is conducted through band-pass filter 4 and applied to the input of modulator 5, which is preferably of the balanced type so that the 116 kc. carrier frequency, which frequency is determined by the frequency allocation on the line and is equal to the sum of the carrier frequencies used at the first and second terminals, generated by repeater oscillator 6 is suppressed in the modulator. Since band-pass filter 7 selects the lower sideband of the modulated 116 kc. carrier wave, the first pilot frequency is converted to a 68 kc. signal plus any error in frequency which may be introduced by oscillator 6. The resulting signal is passed through filter 7 to the next section of the transmission line TL and, at repeater 2, is passed through band-pass filter 8 to the input of balanced modulator 9. The lower sideband of the modulated 116 kc. carrier wave, which carrier wave is supplied by oscillator 10, is selected by band-pass filter 11. Thus, the first pilot frequency arriving at the west terminal group equipment has a frequency of 48 kc. plus the algebraic sum of the frequency errors, if any, introduced by repeater oscillators 6 and 10.

At the west terminal, the first pilot frequency is passed by band-pass filter 12, amplified in adjustable gain amplifier 13, and applied to the input of the balanced demodulator 14. Also, the amplified first pilot frequency appearing in the output of amplifier 13 is picked off by band-pass filter 15, amplified by amplifier 16, and applied as a carrier wave to the balanced modulator 17. It will be noted that signals appearing in the output of demodulator 14 are amplified by amplifier 18 and applied to the receiving terminal which connects to band-pass filters in the channel equipment (not shown). Also, 20 kc. signals appearing in the output of amplifier 18 are picked off by band-pass filter 19, amplified in variable gain amplifier 40, and applied to the input of modulator 17.

Band-pass filter 19 must be sharply tuned to 20 kc. and is preferably of the crystal filter type. When power is first applied to the circuit, the operation of this portion of the system is initiated by a transient. The 48 kc. plus error first pilot frequency acting as carrier for transmitting modulator 17, is modulated with the 20 kc. signal passed by filter 19 and amplified by amplifier 40 to produce a 68 kc. plus error second pilot frequency at the output of modulator 17. The second pilot frequency is passed by band-pass filter 20, amplified by amplifier 21, and applied as a carrier wave to the balanced demodulator 14. The second pilot frequency of 68 kc. plus error is, of course, modulated with the first pilot frequency plus error in demodulator 14 to produce a 20 kc. signal without error which is, in turn, passed by filter 19. Thus it can be seen, that the operation is of the closed ring type and, once started, is self-sustaining.

To further explain the operation of this portion of the circuit, it will be noted that the output of variable gain amplifier 40 is rectified by rectifier 41 and applied to the input of amplifier 40 for the purpose of adjusting the gain of said amplifier. When power is first applied to the circuit, the gain of amplifier 40 is at a maximum. Since the over-all gain at this time through the closed ring just described is much greater than when the operation is stabilized, the circuit tends toward oscillation at 20 kc. As the level of 20 kc. signal increases, the gain of amplifier 40 is, of course, reduced. Since filter 19 is connected between the receiving and transmitting channels of the west terminal, it must be interposed in the circuit by a high impedance coupling. This may be accomplished by transformer coupling or in any other well known manner.

Inasmuch as the first pilot frequency plus error is utilized as the carrier wave for the 12–28 kc. signals appearing in the transmitting channel of the west terminal group equipment from the channel equipment, the selected sideband frequencies are shifted in frequency by an amount equal to the frequency error introduced in the first pilot frequency in traversing the transmission line. The upper sideband of the modulated first pilot frequency plus error and the second pilot frequency, which as previously explained is also shifted in frequency, are passed to transmission line TL by band-pass filter 23 after being amplified by amplifier 22. At repeater 2, these signals are passed by band-pass filter 24 and applied to the input of balanced modulator 25. In modulator 25, the 116 kc. carrier wave supplied by oscillator 10 is modulated with the 60–76 kc. signals and the resulting lower sideband, namely, 40–56 kc., is passed by band-pass filter 26 to the next section of the transmission line TL. Any error introduced in the first pilot frequency by oscillator 10 is automatically canceled in the signals transmitted from the west terminal to the east terminal. To illustrate this feature, assume that the error E1 is introduced in the first pilot frequency by repeater 2 so that it becomes 48 kc. plus E1. Since the signals transmitted from west to east are modulated with the first pilot frequency, they have a frequency of 60–76 kc. plus E1. In repeater 2, the lower sideband passed through filter 26 has a frequency range of 116 kc.$+E1-$(60–75 kc.$+E1$) which equals 40–56 kc.

In repeater 1, the 40–56 kc. band is passed through band-pass filter 27, modulated with 116 kc., and the resulting 60–76 kc. band is passed through band-pass filter 28 to the transmission line TL. Any frequency error introduced in the first pilot frequency by oscillator 6 is automatically canceled in repeater 1 in the same manner as explained in conjunction with the operation of repeater 2.

At the east terminal, the 60–76 kc. band and the second pilot frequency of 68 kc. arrive without error and are passed through band-pass filter 29, amplified in adjustable gain amplifier 30, and applied to the input of balanced demodulator 31. Since the first pilot frequency of 48 kc. produced by oscillator 1 is utilized as the demodulating frequency for demodulator 31, and since the received 60–76 kc. band is without frequency error, the 12–28 kc. signals appearing at the output of demodulator 31, amplified by amplifier 32, and applied to the channel equipment, are an exact reproduction of the input signals applied to the transmitting channel of the west terminal group equipment. The 20 kc. signal appearing in the output of amplifier 32, which results from the modulation of the first pilot frequency with the second pilot frequency in demodulator 31, is passed by band-pass filter 33, rectified by rectifier 34, and applied to the input of amplifier 30 to adjust the gain of said amplifier. Amplifier 30 and the automatic gain control circuit may be of any well known type.

The second pilot frequency appearing in the output of amplifier 30 is also passed by band-pass filter 35, amplified by amplifier 36, and applied to balanced modulator 37 as a carrier wave for signals transmitted from east to west. Since the second pilot frequency arrives at the east terminal without error and since the first pilot frequency is generated at the east terminal, both the 40–56 kc. band of signals and the 48 kc. first pilot frequency transmitted from the east terminal arrive at the west terminal with the same frequency error after traversing transmission line TL and the repeaters 1 and 2. At the west terminal, the second pilot frequency of 68 kc. plus error is utilized to demodulate the sideband plus error received from the east terminal, as previously described. Thus, the 12–28 kc. band of signals appearing at the output of demodulator 14 and applied to the channel equipment is an exact reproduction of the input signals applied to the transmission channel at the east terminal group equipment.

Also at the west terminal, the 20 kc. signal passed by band-pass filter 19 is amplified by amplifier 38, rectified by rectifier 39, and applied to the input of amplifier 13 to adjust the gain of said amplifier. As previously stated, amplifier 13 and the automatic gain control circuit may be of any well known type. The output of rectifier 39 may also be used to control a pilot alarm circuit in the well known manner.

It will be apparent that oscillator 1 may drift in frequency without distorting the signals in either direction of transmission since the output of this oscillator is used for modulating and demodulating the signals in both directions of transmission. Of course, the amount of frequency drift which can be tolerated is controlled by the requirements of the various band-pass filters used in the system. To illustrate this feature of the invention, assume that oscillator 1 has an output frequency of 48 kc.$+E2$ and, to simplify the explanation, that no repeaters are used between the first and second terminals or, if used, introduce no frequency error in the transmitted signals. At the west terminal, the received first pilot frequency of 48 kc.$+E2$ is modulated with the voice band and the 20 kc. signal to produce 60–76 kc.$+E2$ and 68 kc.$+E2$, respectively. At the east terminal, the received 60–76 kc.$+E2$ band is demodulated with 48 kc.$+E2$ to produce 12–28 kc. and the received second pilot frequency of 68 kc.$+E2$ is modulated with the voice band to produce 40–56 kc.$+E2$. At the west terminal, the received 40–56 kc.$+E2$ band is demodulated with 68 kc.$+E2$ to produce 12–28 kc.

It will be obvious to those skilled in the art that this particular feature of the invention is also useful in short haul carrier systems where no band inverting repeaters are used between the first and second terminals. The short haul carrier system may be either of the two-wire or four-wire type or may be of the radio link type. Since a single oscillator is used, frequency synchronization between terminals is no longer a problem, and even the exact frequency of the single oscillator is not critical.

The system has been illustrated with an even number of band inverting repeaters. It will be readily apparent to those skilled in the art that the system may be used with an odd number of band inverting repeaters by interchanging band-pass filters 15 and 20 and by interchanging band-pass filters 12 and 23 all at the west terminals. Also, the transmitting and receiving frequencies at the east terminal can be interchanged to achieve high group transmission if desired. In this case, a proper selection of filters at the west terminal depends upon the number of repeaters used.

While there has been shown and described what is considered at present to be the preferred embodiment of the invention, modifications thereto will readily occur to those skilled in the art. It is not, therefore, desired that the invention be limited to the specific arrangement shown and described, and it is intended to cover in the appended claims all such modifications as fall within the true spirit and scope of the invention.

What is claimed is:

1. In a two-way carrier system comprising first and second carrier terminals interconnected by a transmission network, means at said first terminal for generating a first pilot frequency, means for transmitting said first pilot frequency to said second terminal, means at said second terminal for deriving a second pilot frequency from said received first pilot frequency, means for transmitting said second pilot frequency to said first terminal, means at said first terminal for utilizing said received second pilot frequency as a modulating frequency for signals transmitted to said second terminal from said first terminal, means at said second terminal for demodulating signals received from said first terminal with said second pilot frequency, means at said second terminal for utilizing said received first pilot frequency as a modulating frequency for signals transmitted to said first terminal from said second terminal, and means at said first terminal for demodulating signals received from said second terminal with said first pilot frequency.

2. In a two-way carrier system comprising first and second carrier terminals interconnected by a transmission network which tends to introduce the same frequency error in signals transmitted therethrough in both directions of transmission, means at said first terminal for generating a first pilot frequency, means for transmitting said first pilot frequency through said network to said second terminal, means at said second terminal for developing a second pilot frequency which is shifted in frequency by an amount equal to the error introduced in said first pilot frequency, means for transmitting said second pilot frequency through said network to said first terminal, means at said first terminal for utilizing said received second pilot frequency as a modulating carrier frequency for signals to be transmitted to said second terminal, means for transmitting said signals through said network to said second terminal, means at said second terminal for demodulating the signals received at said second terminal with said second pilot frequency, means at said second terminal for utilizing said received first pilot frequency as a modulating carrier frequency for signals to be transmitted to said first terminal, means for transmitting said signals through said network to said first terminal, and means at said first terminal for demodulating the signals received at said first terminal with said first pilot frequency.

3. In a two-way carrier system comprising first and second terminals interconnected by a transmission network, means at said first terminal for generating a first pilot frequency, means for transmitting said first pilot frequency to said second terminal, means at said second terminal for deriving a second pilot frequency from said first pilot frequency, means for transmitting said second pilot frequency to said first terminal, a first signal, means at said first terminal for amplitude modulating said received second pilot frequency with said first signal and for suppressing said second pilot frequency, means for transmitting at least one of the sidebands of said modulated second pilot frequency to said second terminal, means at said second terminal for demodulating the sideband received at said second terminal with said second pilot frequency, a second signal, means at said second terminal for amplitude modulating said received first pilot frequency with said second signal and for suppressing said first pilot frequency, means for transmitting at least one of the sidebands of said modulated first pilot frequency to said first terminal, and means at said first terminal for demodulating the sideband received at said first terminal with said first pilot frequency.

4. In a two-way carrier system comprising first and second terminals interconnected by a transmission network which tends to introduce the same frequency error in signals transmitted therethrough in both directions of transmission, means at said first terminal for generating a first pilot frequency, means for transmitting said first pilot frequency through said network to said second terminal, means at said second terminal for developing a second pilot frequency which is shifted in frequency by an amount equal to the error introduced in said first pilot frequency, means for transmitting said second pilot frequency through said network to said first terminal, a first signal, means at said first terminal for amplitude modulating said received second pilot frequency with said first signal and for suppressing said second pilot frequency, means for transmitting at least one of the sidebands of said modulated second pilot frequency through said network to said second terminal, means at said second terminal for demodulating the sideband received at said second terminal with said second pilot frequency, a second signal, means at said second terminal for amplitude modulating said received first pilot frequency with said second signal and for suppressing said first pilot frequency, means for transmitting at least one of the sidebands of said modulated first pilot frequency through said network to said first terminal, and means at said first terminal for demodulating the sideband received at said first terminal with said first pilot frequency.

5. In a two-way carrier system comprising first and second carrier terminals interconnected by a transmission network which tends to introduce the same frequency error in signals transmitted therethrough in both directions of transmission, means at said first terminal for generating a first pilot frequency, means for transmitting said first pilot frequency through said network to said second terminal whereby the pilot frequency received at said second terminal may include a frequency error introduced by said network, means at said second terminal for deriving a second pilot frequency from the pilot frequency received at the second terminal whereby said second pilot frequency is shifted in frequency by an amount equal to the error introducted in said first pilot frequency, means for transmitting said second pilot frequency through said network to said first terminal whereby the pilot frequency received at said first terminal is without frequency error, means at said first terminal for utilizing the pilot frequency received at said first terminal as a modulating frequency for signals to be transmitted to said second terminal, means for transmitting the signals through said network to said second terminal whereby the signals received at said second terminal may include a frequency error introduced by said network, means at said second terminal for demodulating the signals received at said second terminal with said second pilot frequency, means at said second terminal for utilizing the pilot frequency received at said second terminal as a modulating frequency for signals to be transmitted to said first terminal whereby said signals are shifted in frequency by an amount equal to the error introduced into said first pilot frequency, means for transmitting said signals through said network to said first terminal whereby the signals received at said first terminal are without frequency error, and means at said first terminal for demodulating the signals received at said first terminal with said first pilot frequency.

6. In a two-way suppressed carrier system in which opposite directions of transmission between first and second carrier terminals are characterized by high and low frequency bands respectively, a transmission network interconnecting said first and second terminals and including spaced repeater stations, said repeaters each including a modulator for interchanging the high and low bands in their passage through a repeater, means at said first terminal for transmitting a first pilot frequency which lies within the frequency band transmitted by said first terminal, means at said second terminal for deriving a second pilot frequency from the received frequency corresponding to said first pilot frequency, means at said second terminal for transmitting said second pilot frequency, means at each terminal for utilizing the received frequency corresponding to the pilot frequency transmitted by the other terminal as a carrier wave to produce the frequency band transmitted by that terminal, means at said first terminal for demodulating the received frequency band with said first pilot frequency, and means at said second terminal for demodulating the received frequency band with said second pilot frequency.

7. In a two-way suppressed carrier system in which opposite directions of transmission between first and second carrier terminals are characterized by high and low frequency bands respectively, a transmission network interconnecting said first and second terminals and including spaced repeaters, each of said repeaters including a modulator for interchanging the high and low bands in their transmittal through a repeater and which tends to introduce frequency errors in said bands, means at said first terminal for transmitting a first pilot frequency which lies within the frequency band transmitted by said first terminal, means at said second terminal for developing a second pilot frequency which lies within the frequency band transmitted by said second terminal and which is shifted in frequency by an amount equal to the error introduced in said first pilot frequency, means at said second terminal for transmitting said second pilot frequency, means at each terminal for utilizing the received frequency corresponding to the pilot frequency transmitted by the other terminal as a carrier wave to produce the frequency band transmitted by that station, means at said first terminal for demodulating the received frequency band with said first pilot frequency, and means at said second terminal for demodulating the received frequency band with said second pilot frequency.

8. In a two-way carrier system comprising first and second terminals interconnected by a transmission network, means at said first terminal for generating a first pilot frequency, means for transmiting said first pilot frequency to said second terminal, a demodulator at said second terminal, means for applying said received first pilot frequency to the input of said demodulator, a band-pass filter connected to the output of said demodulator, said filter being sharply tuned to a certain frequency, means for modulating said received first pilot frequency with the signal passed by said band-pass filter to derive a second pilot frequency, means for transmitting said second pilot frequency to said first terminal, first input signals, means at said first terminal for amplitude modulating said received second pilot frequency with said first input signals and for suppressing said second pilot frequency, means for transmitting at least one of the sidebands of said modulated second pilot frequency to said second terminal, means for applying the received sideband to the input of said demodulator, and means for applying said second pilot frequency to said demodulator to demodulate said received sideband and to sustain the generation of said certain frequency.

9. In a two-way carrier system comprising first and second terminals interconnected by a transmission network, means at said first terminal for generating a first pilot frequency, means for transmitting said first pilot frequency to said second terminal, said second terminal comprising an adjustable gain amplifier and a demodulator, means for applying said received first pilot frequency to the input of said amplifier, means for applying the signals appearing in the output of said amplifier to the input of said demodulator, a band-pass filter connected to the output of said demodulator, said filter being sharply tuned to a certain frequency, means for modulating the amplified first pilot frequency appearing in the output of said amplifier with the signal passed by said filter to derive a second pilot frequency, means for transmitting said second pilot frequency to said first terminal, input signals, means at said first terminal for amplitude modulating said received second pilot frequency with said input signals and for suppressing said second pilot frequency, means for transmitting at least one of the sidebands of said modulated second pilot frequency to said second terminal, means for applying the received sideband to the input of said amplifier, means for applying said second pilot frequency to said demodulator to demodulate said received sideband and to sustain the generation of said certain frequency, and means for utilizing the signal passed by said filter to adjust the gain of said amplifier.

10. In a two-way carrier system comprising first and second terminals interconnected by a transmission network, means at said first terminal for generating a first pilot frequency, means for transmitting said first pilot frequency to said second terminal, a demodulator at said second terminal, means for applying said received first pilot frequency to the input of said demodulator, a band-pass filter connected to the output of said demodulator, said filter being sharply tuned to a certain frequency, means for modulating said received first pilot frequency with the signal passed by said band-pass filter to derive a second pilot frequency, means for transmitting said second pilot frequency to said first terminal, first input signals, means at said first terminal for amplitude modulating said received second pilot frequency with said first input signals and for suppressing said second pilot frequency, means for transmitting at least one of the sidebands of said modulated second pilot frequency to said second terminal, means for applying the received sideband to the input of said demodulator, means for applying said second pilot frequency to said demodulator to demodulate said received sideband and to sustain the generation of said certain frequency, second input signals, means at said second terminal for amplitude modulating said received first pilot frequency with said second input signals and for suppressing said first pilot frequency, means for transmitting at least one of the sidebands of said modulated first pilot frequency to said first terminal, and means at said first terminal for demodulating the sideband received at said first terminal with said first pilot frequency.

11. In a carrier system comprising first and second terminals interconnected by a transmission network, means at said first terminal for generating a first pilot frequency, means for transmitting said first pilot frequency to said second terminal, said second terminal comprising an adjustable gain amplifier and a demodulator, means for applying said received first pilot frequency to the input of said amplifier, means for applying the signals appearing in the output of said amplifier to the input of said demodulator, a band-pass filter connected to the output of said demodulator, said filter being sharply tuned to a certain frequency, means for modulating the amplified first pilot frequency appearing in the output of said amplifier with the signal passed by said filter to derive a second pilot frequency, means for transmitting said second pilot frequency to said first terminal, first input signals, means at said first terminal for amplitude modulating said received second pilot frequency with said first input signals and for suppressing said second pilot frequency, means for transmitting at least one of the sidebands of said modulated second pilot frequency to said second terminal, means for applying the received sideband to the input of said amplifier, means for applying said second pilot frequency to said demodulator to demodulate said received sideband and to sustain the generation of said certain frequency, means for utilizing the signal passed by said filter to adjust the gain of said amplifier, second input signals, means at said second terminal for amplitude modulating said received first pilot frequency with said second input signals and for suppressing said first pilot frequency, means for transmitting at least one of the sidebands of said modulated first pilot frequency to said first terminal, and means at said first terminal for demodulating the sideband received at said first terminal with said first pilot frequency.

12. In a two-way suppressed carrier system in which opposite directions of transmission between first and second carrier terminals are characterized by high and low frequency bands respectively, a transmission network interconnecting said first and second terminals and including spaced repeater stations, said repeaters each including a group modulator for interchanging the high and low bands in their passage through a repeater, means at said first terminal for transmitting a first pilot frequency which lies within the frequency band transmitted by said first terminal, said second terminal comprising a demodulator having an input circuit and an output circuit, means for applying the band of frequencies received at said second terminal to the input circuit of said demodulator, a band-pass filter, means for connecting said filter to the output circuit of said demodulator, said filter being tuned to the difference frequency of said first pilot frequency and the suppressed carrier frequency at said first terminal, means at said second terminal for modulating the received frequency corresponding to said first pilot frequency with the signal passed by said filter to derive a second pilot frequency, means at said second terminal for transmitting said second pilot frequency, means at said first terminal for utilizing the received frequency corresponding to said second pilot frequency as a carrier wave to produce the frequency band transmitted by said first terminal, means at said second terminal for applying said second pilot frequency to said demodulator to demodulate the received frequency band and to sustain the generation of said difference frequency, means at said second terminal for utilizing the received frequency corresponding to said first pilot frequency as a carrier wave to produce the frequency band transmitted by said second terminal, and means at said first terminal for demodulating the received frequency band with said first pilot frequency.

13. In a two-way suppressed carrier system in which opposite directions of transmission between first and second carrier terminals are characterized by high and low frequency bands respectively, a transmission network interconnecting said first and second terminals and including spaced repeater stations, said repeaters each including a group modulator for interchanging the high and low bands in their passage through a repeater, means at said first terminal for transmitting a first pilot frequency which lies within the frequency band transmitted by said first terminal, said second terminal comprising an adjustable gain amplifier and a demodulator, means for applying the frequency band received at said second terminal to the input of said amplifier, means for applying signals appearing in the output of said amplifier to the input of said demodulator, a band-pass filter connected to the output of said demodulator, said filter being sharply tuned to a particular frequency, means for modulating the amplified received signal corresponding to said first pilot frequency appearing in the output of said amplifier with the signal passed by said filter to derive a second pilot frequency, means at said second terminal for transmitting said second pilot frequency, means at said first terminal for utilizing the received frequency corresponding to said second pilot frequency as a carrier wave to produce the frequency band transmitted by said first terminal, means at said second terminal for applying said second pilot frequency to said demodulator to demodulate the received frequency band and to sustain the generation of said particular frequency, means for utilizing the signal passed by said filter to adjust the gain of said amplifier, means at said second terminal for utilizing the received frequency corresponding to said first pilot frequency as a carrier wave to produce the frequency band transmitted by said second terminal, and means at said first terminal for demodulating the received frequency band with said first pilot frequency.

14. In a carrier system comprising first and second terminals interconnected by a transmission network, a first adjustable gain amplifier and a first demodulator at said first terminal, a second adjustable gain amplifier and a second demodulator at said second terminal, means at said first terminal for generating a first pilot frequency, means for transmitting said first pilot frequency over said network to said second terminal, means at said second terminal for applying signals received from said first terminal to the input of said second amplifier, means for applying the signals appearing in the output of said second amplifier to the input of said second demodulator, a first band-pass filter connected to the output of said second demodulator, said first filter being sharply tuned to a certain frequency, means for modulating the amplified first pilot frequency appearing in the output of said second amplifier with the signal passed by said first filter to derive a second pilot frequency, means for transmitting said second pilot frequency to said first terminal, means at said first terminal for applying signals received from said second terminal to the input of said first amplifier, means for applying the signals appearing in the output of said first amplifier to the input of said first demodulator, first input signals, means at said first terminal for amplitude modulating the amplified second pilot frequency appearing in the output of said first amplifier with said first input signals and for suppressing said second pilot frequency, means for transmitting at least one of the sidebands of said modulated second pilot frequency to said second terminal, means for applying said second pilot frequency to said second demodulator to demodulate said received sideband and to sustain the generation of said certain frequency, means for utilizing the signal passed by said first filter to adjust the gain of said second amplifier, second input signals, means at said second terminal for modulating said amplified first pilot frequency with said second input signals and for suppressing said first pilot frequency, means for transmitting at least one of the sidebands of said modulated first pilot frequency to said first terminal, a second band-pass filter at said first terminal connected to the output of said first demodulator, said second filter being sharply tuned to said certain frequency, means for applying said first pilot frequency to said first demodulator to demodulate the sideband received at said first terminal, and means for utilizing the signal passed by said second filter to adjust the gain of said first amplifier.

References Cited in the file of this patent

UNITED STATES PATENTS

| | | |
|---|---|---|
| 2,300,415 | Green | Nov. 3, 1942 |
| 2,530,748 | Winchel | Nov. 21, 1950 |
| 2,611,859 | Bailey et al. | Sept. 23, 1952 |
| 2,634,334 | Kolb | Apr. 7, 1953 |